(12) United States Patent
Ooto

(10) Patent No.: US 7,224,661 B2
(45) Date of Patent: May 29, 2007

(54) WAVE PLATE AND OPTICAL PICKUP UNIT USING THE SAME

(75) Inventor: Masayuki Ooto, Kouza-gun (JP)

(73) Assignee: Toyo Communication Equipment Co., Ltd., Kanagawa (JP)

(*) Notice: Subject to any disclaimer, the term of this patent is extended or adjusted under 35 U.S.C. 154(b) by 539 days.

(21) Appl. No.: 10/828,055

(22) Filed: Apr. 20, 2004

(65) Prior Publication Data
US 2004/0246875 A1 Dec. 9, 2004

(30) Foreign Application Priority Data
Apr. 24, 2003 (JP) ............................. 2003-119915

(51) Int. Cl.
G11B 7/00 (2006.01)
(52) U.S. Cl. .............................. 369/112.01; 369/110.04
(58) Field of Classification Search ........... 369/110.03, 369/112.17, 110.04, 112.02, 112.18, 112.01, 369/112.19
See application file for complete search history.

(56) References Cited
U.S. PATENT DOCUMENTS
6,504,811 B1 * 1/2003 Morimoto .............. 369/110.03

* cited by examiner

Primary Examiner—Nabil Hindi
(74) Attorney, Agent, or Firm—Koda & Androlia

(57) ABSTRACT

As a ½ wave plate constituted by laminating two wave plates, a wave plate where temperature dependence of a phase difference is reduced is provided. In a wave plate constituted by laminating a first wave plate having a phase difference $\tau_1$ (deg.) and an optical axis azimuth $\theta_1$ (deg.), and a second wave plate having a phase difference $\tau_2$ (deg.) and an optical axis azimuth $\theta_2$ (deg.), the phase difference $\tau_1$ (deg.) of the first wave plate and the phase difference $\tau_2$ (deg.) of the second wave plate are set to 360n+180 (n=0, 1, 2 . . . ), and an angle formed by polarization planes of incident light and emitted light is $\theta$ (deg.). In this case, the first wave plate and the second wave plate are laminated so as to satisfy $\theta_1=(90+\theta/2)/2$ and $\theta_2=\theta_1+90+\theta/2$.

3 Claims, 6 Drawing Sheets (a)                        (b)

WAVE PLATE AND OPTICAL PICKUP UNIT USING THE SAME

BACKGROUND OF THE INVENTION

1. Field of the Invention

The present invention relates to a wave plate to be used in an optical pickup unit, and particularly relates to the wave plate which compensates temperature dependence of a phase difference.

2. Background Art

In recent years, there is a need to process a vast amount of various information including characters, images, and the like at a higher speed along with the penetration of the multimedia. For this reason, there is an increasing demand for compact optical disks such as a CD and a DVD that can be read and written at a high speed with storage capacity remarkably larger than that of a conventional magnetic recording media. Optical pickup units are used to read digital signals of sounds, images, and the like written into the optical disks. The units emit laser beams onto optical disks and pick up their reflected light so as to read digital signals from recording media created as pits on surfaces of the optical disks. Wave plates which are used as optical parts of the optical pickup units change a polarizing state of light. Such wave plates include ¼ wave plates which shift a phase difference by 90 degrees so as to convert linear polarized light into circular polarized light or convert circular polarized light into linear polarized light, ½ wave plates which shift a phase difference by 180 degrees so as to rotate a polarization plane of linear polarized light, and the like. FIG. 5 is a diagram showing a constitution of the ½ wave plate. Linear polarized light enters a ½ wave plate 11, and when an angle formed by the incident polarization plane and an optical axis of a board is assumed to be θ, emitted light rotates by 2θ with respect to the incident polarization plane so as to become linear polarized light.

The ½ wave plates made of a crystalline material such as crystal include a ½ wave plate which is constituted by laminating two wave plates as well as the ½ wave plate constituted by a single plate. In such a ½ wave plate, two wave plates are laminated so that a phase difference is 180 degrees, and although the cost becomes higher than that of single-plate constitution, ½ wave plate having excellent incident angle dependence can be realized. FIGS. 6(*a*) and 6(*b*) are diagrams showing the constitution of the ½ wave plate where two wave plates are laminated. A wave plate A has 1080 degrees of a phase difference and 15 degrees of an optical axis azimuth, a wave plate B has 900 degrees of a phase difference and 105 degrees of an optical axis azimuth. The wave plates A and B are laminated so that an angle formed by the optical axes of the wave plates A and B becomes a right angle, thereby rotating an emitted light polarization plane by 30 degrees.

The temperature dependence of the wave plate is examined. FIG. 7 is a diagram showing the temperature dependence of the phase difference of the wave plate. As shown in FIG. 7, the phase difference of the wave plate is 180 degrees under the condition of the room temperature 25° C., but when the temperature shifts from the room temperature, the phase difference shifts from 180 degrees. When the temperature dependence of the phase difference of the wave plate is high, the phase difference of the emitted light changes due to the temperature, and this phenomenon is not preferable for the optical pickup unit. The present invention solves the above problem, and its object is to provide a wave plate which is constituted by laminating two wave plates and where temperature dependence of a phase difference is small, and an optical pickup unit using the same.

SUMMARY OF THE INVENTION

In order to achieve the above object, a first aspect of the invention provides a wave plate constituted by laminating a first wave plate having a phase difference $\tau_1$ (deg.) and an optical axis azimuth $\theta_1$ (deg.), and a second wave plate having a phase differences $\tau_2$ (deg.) and an optical axis azimuth $\theta_2$ (deg.), wherein when the phase difference $\tau_1$ (deg.) of the first wave plate and the phase difference $\tau 2$ (deg.) of the second wave plate are set to 360n+180 (n=0, 1, 2 . . . ), and an angle formed by polarization planes of incident light and emitted light is θ (deg.), the first wave plate and the second wave plate are laminated so as to satisfy $\theta_1 = (90+\theta/2)/2$ and $\theta_2 = \theta_1 + 90 + \theta/2$. A second aspect of the invention provides the wave plate according to the first aspect in which the first wave plate and the second wave plate are made of a crystalline board. A third aspect of the invention provides an optical pickup unit having the wave plate according to any one of the first and the second aspects.

DETAILED DESCRIPTION OF THE PREFERRED EMBODIMENTS

The present invention will be explained in detail below with reference to the embodiments shown in the accompanying drawings.

Figure 1:
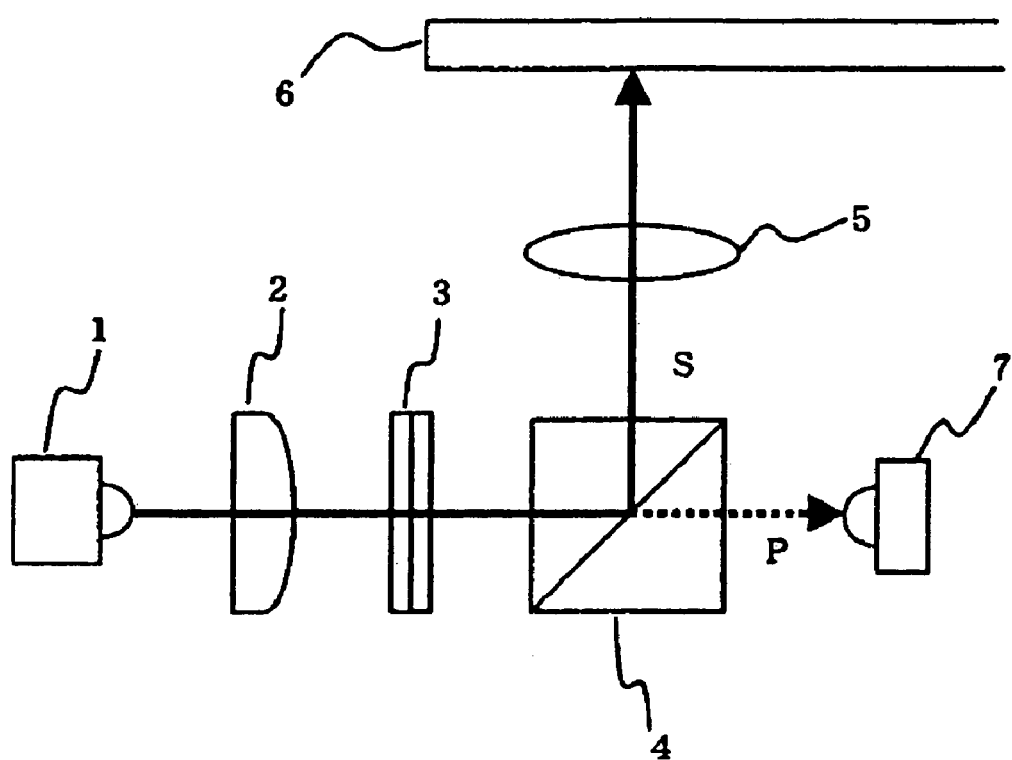
FIG. 1 is a pattern diagram showing an optical pickup unit according to the present invention.

FIG. 1 is a pattern diagram showing an optical pickup unit according to the present invention. Light emitted from a semiconductor laser 1 is converted into parallel light by a collimating lens 2, and a polarization plane is rotated by a ½ wave plate 3. The light which passes through the ½ wave plate 3 enters a polarizing beam splitter 4 which reflects most of S-polarized light and transmits most of P-polarized light. The S-polarized light reflected from the polarizing beam splitter 4 is converged by an objective lens 5 so as to be emitted to an optical disk 6. The P-polarized light which passes through the polarizing beam splitter 4 is received by a light amount monitor 7. Further, the collimating lens 2 is occasionally arranged after the polarizing beam splitter 4.

In the optical pickup unit, the ½ wave plate has a function of rotating incident linear polarized light and shifting a phase difference by 180 degrees so as to emit the light. In conventional wave plates, since temperature dependence of a phase difference is high, the phase difference shifts due to a change in temperature, and the conventional wave plates have a bad effect on the optical pickup unit. In order to solve this problem, the present invention provides a wave plate in which the temperature dependence of a phase difference is reduced.

Figure 2:
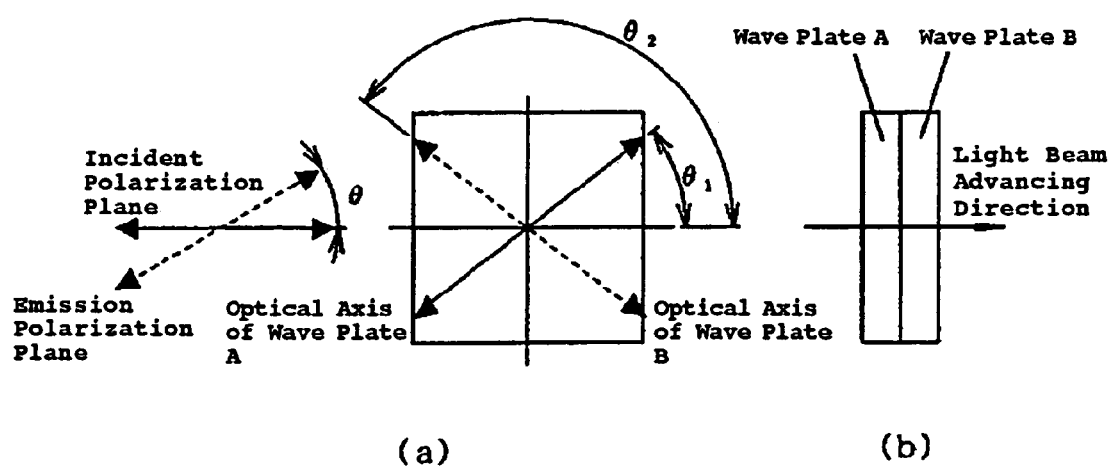
FIGS. 2(*a*) and 2(*b*) are views showing a constitution of a wave plate according to the present invention, in which FIG. 2(*a*) is a plan view thereof and FIG. 2(*b*) is a side view thereof.

The wave plate of the present invention is explained in detail below. FIGS. 2(a) and 2(b) are a plan view and a side view of the wave plate of the present invention. Two wave plates are laminated so that the ½ wave plate is constituted. An optical axis azimuth of a wave plate A (first wave plate) is $\theta_1$, an optical axis azimuth of a wave plate B (second wave plate) is $\theta_2$, and an angle formed by polarization planes of incident light and emitted light is $\theta$. In this case, phase differences $\tau_1$, $\tau_2$ (deg.) of the wave plate A and the wave plate B are set to $360 \times n + 180$ (n=0, 1, 2 . . . ) with respect to a wavelength of the light.

Figure 3:
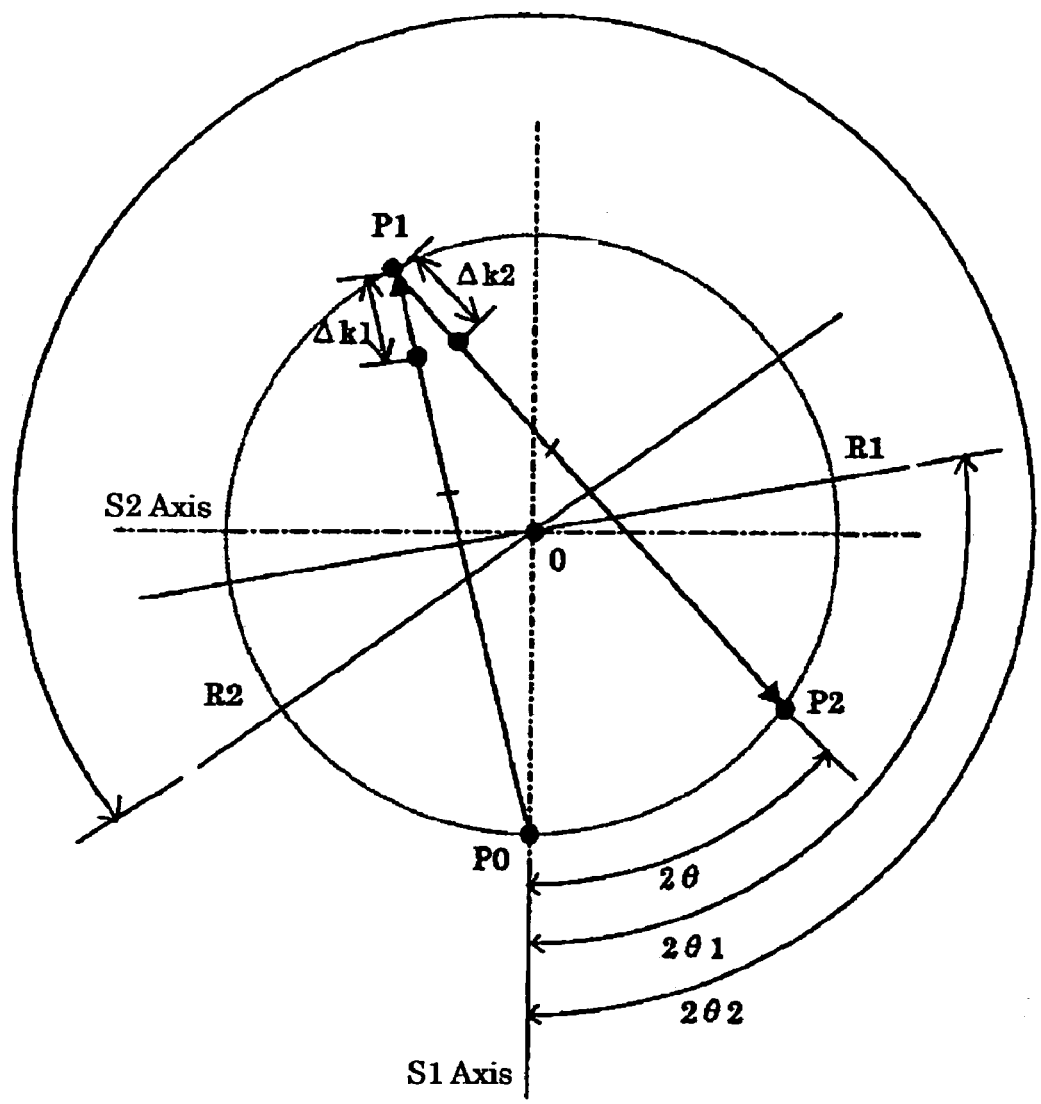
FIG. 3 is a $S_1$–$S_2$ plan view showing a Poincare sphere representing a function of the wave plate according to the present invention.

In FIG. 3, the function of the wave plate is expressed by a $S_1$–$S_2$ plan view of a Poincare sphere. The optical axis azimuth of the wave plate A is $\theta_1$, the optical axis azimuth of the wave plate B is $\theta_2$, the angle formed by the polarization planes of the incident light and the emitted light is $\theta$, and an actual angle in the Poincare sphere is twice as large as the angle formed by the polarization planes. Rotational axes $R_1$ and $R_2$ are provided in places which are rotated by $2\theta_1$ and $2\theta_2$ with respect to a $S_1$ axis, and they are rotated by the phase differences $\tau_1$ and $\tau_2$ so that the positions determined by the rotation represent a polarizing state of the emitted light. When the incident light in the polarizing state $P_0$ passes through the wave plate A, the phase is changed into a polarizing state $P_1$ by the rotational axis $R_1$, and when the light passes through the wave plate B, the phase is changed into a polarizing state $P_2$ by the rotational axis $R_2$.

When a change in the phase difference of the wave plate due to the temperature change is $\Delta_T \tau_1$ and $\Delta_T \tau_2$ the phase differences of the wave plates A and B satisfy $\Delta_T \tau_1 = \Delta_T \tau_2$ because the phase differences of the phase plates A and B are set to an equal value. Further, since the rotational angles of the rotational axes $R_1$ and $R_2$ change by $\Delta_T \tau_1$ and $\Delta_T \tau_2$ due to the temperature change, they become $\cos \Delta_T \tau_1$ and $\cos \Delta_T \tau_2$ in the Poincare sphere. When values obtained by converting the change in the phase differences due to temperature into lengths $P_0 P_1$ and $P_1 P_2$ are assumed to be $\Delta k_1$ and $\Delta k_2$, the values are expressed as follows:

$$\Delta k_1 = P_0 P_1 / 2 \times (1 - \cos \Delta_T \tau_1), \text{ and } \Delta k_2 = P_1 P_2 / 2 \times (1 - \cos \Delta_T \tau_2).$$

The temperature dependence which is the problem of the present invention is produced because refraction index of a birefringent material changes due to temperature, and when $\Delta k_1$ is equal with $\Delta k_2$, the temperature dependence is canceled by the wave plates A and B. In order to make $\Delta k_1$ equal with $\Delta k_2$, the rotational axes $R_1$ and $R_2$ are obtained, namely, the optical axis azimuths $\theta_1$ and $\theta_2$ of the wave plates A and B should be set so that $P_0 P_1$ is equal with $P_1 P_2$. The inventor of the present invention, therefore, find that when the optical axis azimuth $\theta_1$ (deg.) of the wave plate A is $(90+\theta/2)/2$ and the optical axis azimuth $\theta_2$ (deg.) of the wave plate B is $\theta_1 + 90 + \theta/2$, $P_0 P_1$ is equal with $P_1 P_2$, namely, $\Delta k_1$ is equal with $\Delta k_2$. The inventor consider that the temperature dependence of the phase difference can be canceled in such a manner.

Figure 4:
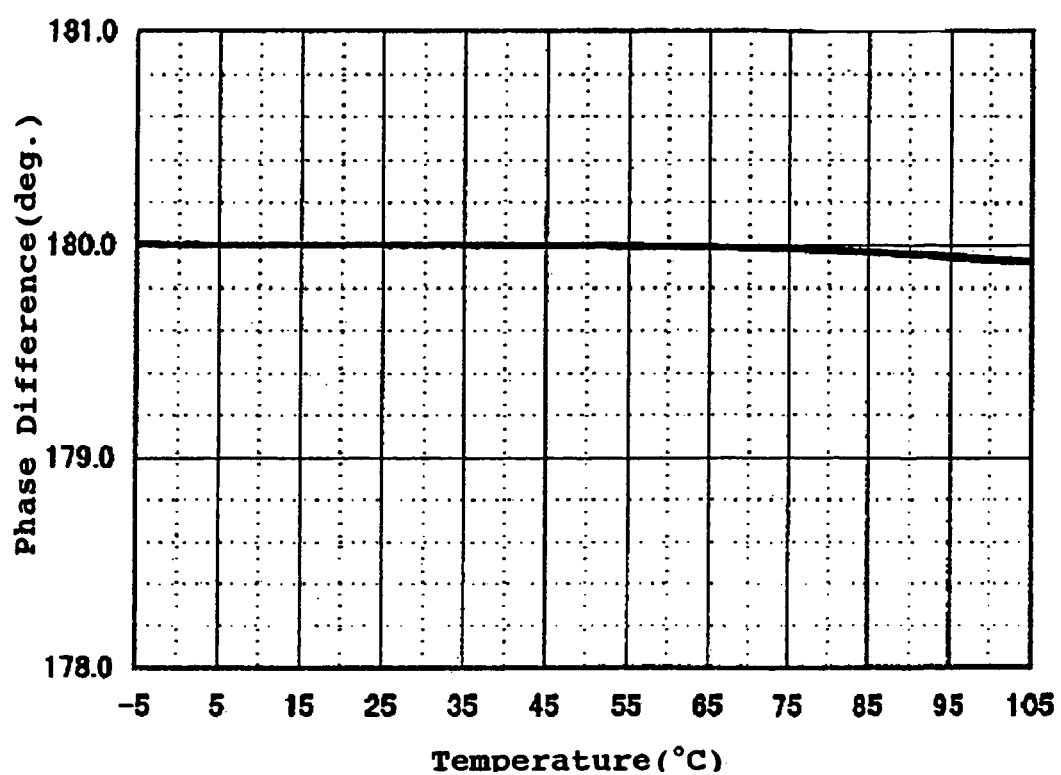
FIG. 4 is a diagram showing a relationship of temperature dependence of a phase difference in the wave plate according to the present invention.
Figure 5:
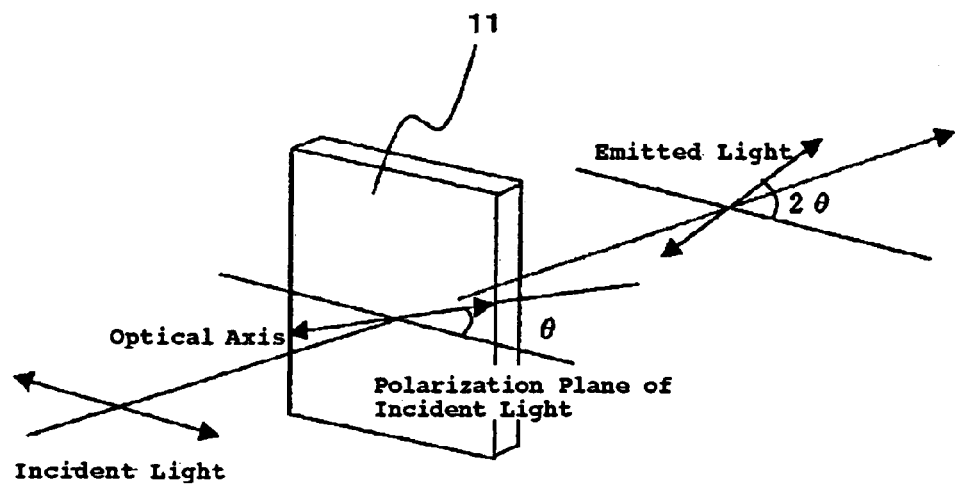
FIG. 5 is a diagram showing a constitution of a conventional wave plate having a single-plate constitution.
Figure 6:
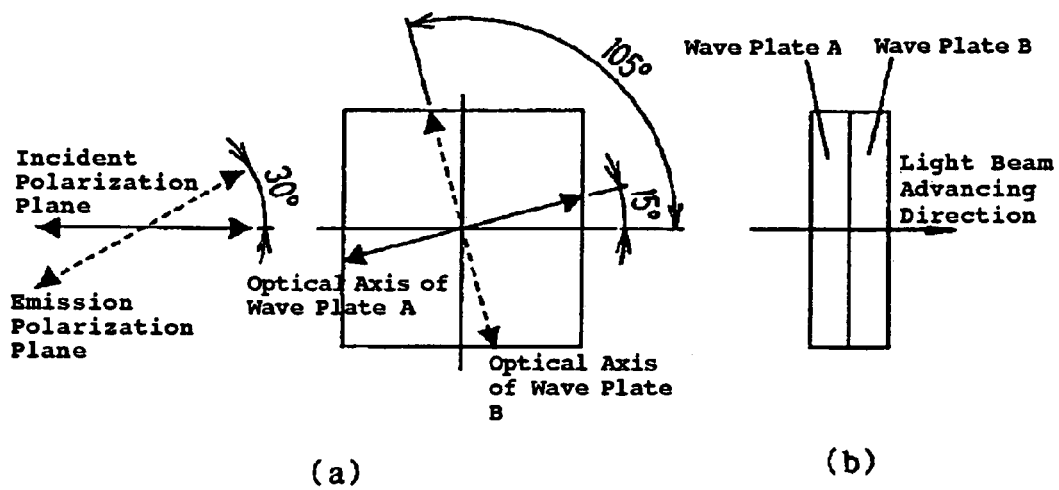
FIGS. 6(*a*) and 6(*b*) are views showing a constitution of a conventional laminated-type wave plate, in which FIG. 6(*a*) is a plan view thereof and FIG. 6(*b*) is a side view thereof.
Figure 7:
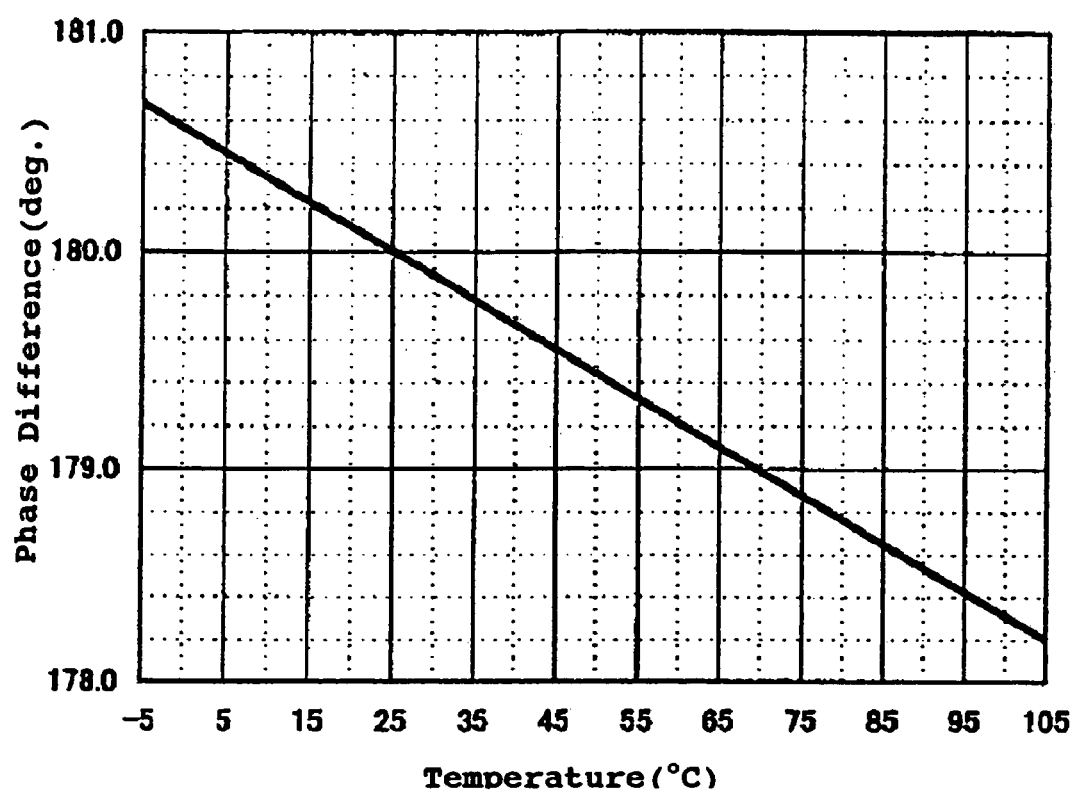
FIG. 7 is a diagram showing a relationship of temperature dependence of a phase difference in the conventional laminated-type wave plate.

FIG. 4 is a diagram showing the temperature dependence of the phase difference in the ½ wave plate of the present invention in which the two wave plates are laminated. The optical axis azimuth $\theta_1$ of the wave plate A is changed from $(90+\theta/2)/2$ into 52.5 degrees, and the optical axis azimuth $\theta_2$ of the wave plate B is changed from $\theta_1 + 90 + \theta/2$ into 157.5 degrees under the following set conditions. The phase difference $\tau_1$ of the wave plate A is equal with the phase difference $\tau_2$ of the wave plate B, namely, both of them are 900 degrees, and the angle $\theta$ formed by the polarization planes of the incident light and the emitted light becomes 30 degrees. It is found from FIG. 4 that even if the temperature shifts from the room temperature 25° C., the phase difference of the wave plate hardly changes, and thus the wave plate with small temperature dependence of the phase difference can be realized.

In the ½ wave plate of the present invention in which the two wave plates are laminated, the temperature dependence of the phase difference can be reduced under the following conditions. The phase difference $\tau_1$ (deg.) of the wave plate A and the phase difference $\tau_2$ (deg.) of the wave plate B are set to $360 \times n + 180$ (n=0, 1, 2 . . . ), and the optical axis azimuth $\theta_1$ (deg.) of the wave plate A is $(90+\theta/2)/2$, and optical axis azimuth $\theta_2$ (deg.) of the wave plate B is $\theta_1 + 90 + \theta/2$. As a result, the stabilized phase difference which does not depend on the temperature can be obtained.

According to the present invention, in the wave plate in which the two wave plates are laminated, since the temperature dependence of the phase difference is reduced, the phase difference of the emitted light is stabilized regardless of the temperature, and an excellent effect is achieved in the optical pickup unit and optical communication apparatuses.

What is claimed is:

1. A wave plate constituted by laminating a first wave plate having a phase difference $\tau_1$ (deg.) and an optical axis azimuth $\theta_1$ (deg.), and a second wave plate having a phase difference $\tau_2$ (deg.) and an optical axis azimuth $\theta_2$ (deg.), wherein when the phase difference $\tau_1$ (deg.) of the first wave plate and the phase difference $\tau_2$ (deg.) of the second wave plate are set to $360n + 180$ (n=0, 1, 2 . . . ), and an angle formed by polarization planes of incident light and emitted light is $\theta$ (deg.), the first wave plate and the second wave plate are laminated so as to satisfy $\theta_1 = (90+\theta/2)/2$ and $\theta_2 = \theta_1 + 90 + \theta/2$.

2. The wave plate according to claim 1, wherein the first wave plate and the second wave plate are made of a crystalline board.

3. An optical pickup unit having the wave plate according to any one of claim 1 and 2.

* * * * *